United States Patent [19]

Ertle et al.

[11] Patent Number: 5,246,654
[45] Date of Patent: Sep. 21, 1993

[54] INTERMEDIATE COMPOSITION AND PROCESS FOR MANUFACTURING INTERMEDIATES FOR LIGHTWEIGHT INORGANIC PARTICLES

[75] Inventors: Raymond T. Ertle; Raymond J. Ertle, both of Pompton Plains, N.J.

[73] Assignee: Cylatec Corp., Pompton Plains, N.J.

[21] Appl. No.: 783,898

[22] Filed: Oct. 29, 1991

[51] Int. Cl.$^5$ .............................................. B29B 9/02
[52] U.S. Cl. .................................. 264/118; 264/140; 264/141; 264/42
[58] Field of Search ................. 264/118, 140, 141, 42; 106/600, 601

[56] References Cited

U.S. PATENT DOCUMENTS

| | | | |
|---|---|---|---|
| 2,039,008 | 4/1936 | Kliefoth | 181/284 |
| 2,117,605 | 5/1938 | Fowler et al. | 65/22 |
| 3,728,208 | 4/1973 | Whittington et al. | 428/405 |
| 3,756,839 | 9/1973 | Rao | 106/604 |
| 3,765,919 | 10/1973 | Gelbman | 106/409 |
| 3,951,834 | 4/1976 | Gillilan | 106/601 |
| 4,203,773 | 5/1980 | Temple et al. | 501/85 |

*Primary Examiner*—Mary Lynn Theisen
*Attorney, Agent, or Firm*—Klauber & Jackson

[57] ABSTRACT

A method of producing dense, free-flowing alkali metal silicate-based particles which, when sufficiently heated, will form lightweight particles of a spumiform nature which may be employed as thermal or acoustical insulation or as a lightweight filler for gypsum or cement or for numerous other purposes. The method comprises premixing a liquid alkali metal silicate with selected fillers and/or insolubilizers, adjusting the temperature and solids content of the mixture until it passes into a dilatant gel state which will fracture when extended at a rate of between about 3 and 95 cm/minute, and subsequently extruding or pelletizing the gel at this temperature to form particles which are conditioned in an air stream for at least one second and then dried to a moisture level of between about 5 and 30%. These particles or pellets serve as a stable intermediate which can be expanded to form lightweight spumiform particles by further heating at a later time or at a remote location.

10 Claims, 1 Drawing Sheet

5,246,654

INTERMEDIATE COMPOSITION AND PROCESS FOR MANUFACTURING INTERMEDIATES FOR LIGHTWEIGHT INORGANIC PARTICLES

This invention is the subject of a Disclosure Document, filed at the United States Patent and Trademark Office on Aug. 27, 1991 under Ser. No. 289,989. This document is hereby incorporated by reference.

The invention described herein relates to free-flowing alkali metal silicate intermediate particles and to methods of preparation and use. These intermediate particles or pellets are expandable to form spumiform particles which have a diameter of at least about five times their pre-expansion width.

BACKGROUND OF THE INVENTION

The processes of making particles of the prior art usually entail the mixing of liquid silicates with various compounds as further described below, heating said mixture to drive off enough water to form a hard glassy material, and subsequently grinding and screening the material into particles of suitable size. Additionally, dry silicates have been employed along with water to form the necessary hydrated silicates.

Silicate-based materials have not found general broad acceptance for the end uses described herein. This is, no doubt, due to the difficulties encountered in producing a suitably dense intermediate of a formulation which has a high expansion rate, is homogeneous, non-caking, easy to handle and easy to produce. The production methods of prior art involve drying the initial mixtures to a point where they can be ground to suitable particles. This normally involves drying the initial mass for long periods of time (from 1 to 4 hours). Such long drying times are felt necessary due to the fact that the silicates in an aqueous media form a skin on their surface during drying which tends to impede further drying to an acceptable moisture range. Attempts to overcome this problem have resulted in some cases in the addition of silicates in the dry form to lower the amount of moisture which must be removed before grinding. The use of these dry silicates, however, necessitates additional waiting periods of up to four hours to allow the dry silicates to hydrate to an expandable form, or requires the use of pressures greater than atmospheric. Additionally, when employing dry silicates as a starting point, other ingredients such as fillers, insolubilizers, etc. are mixed or mulled with the silicate, and remain as discrete particles in the final dense phase, creating less homogeneous mixtures than can be produced by the use of silicate solutions, where optimum dispersions or solutions are possible. All of these methods have serious drawbacks which impede the commercial production of these materials and tend to result in high manufacturing costs.

A number of issued patents can be noted which are of interest. U.S. Pat. No. 3,756,839 relates to the preparation of silicate-based materials which may be intumesced through the use of anhydrous silicates and insoluble powders and water by hydrating said mixture by subsequent application of heat and pressure (or steam under pressure) and subsequently compacting said hydrated mixture. Compacting may be accomplished with the heat and pressure of the hydrating step or by means of a separate press or extruder. This process utilizes raw materials in a finely divided form, and the levels of insoluble powders included are limited by the non-homogeneous nature of the process.

U.S. Pat. No. 4,203,773 relates to the preparation of expanded silicate aggregates also through the use of anhydrous silicates. Anhydrous silicate, a curing agent and an optional insolubilizer are dry mixed; water is added and the mixture is caused to hydrate at temperatures of 80°-90° C. at a humidity level of 90% or higher. This hydration step takes a matter of hours to complete, and the hydrated mass must subsequently be pulverized to the required size before intumescing.

U.S. Pat. No. 3,728,208 relates to intumesced silicate compounds formed through the use of anhydrous and liquid silicates, along with other ingredients which form spumiform particles having a volume of about 3 to 4 times the volume of the extruded pellets.

U.S. Pat. No. 3,765,919 relates to the manufacture of lightweight silicate-based materials through the use of liquid and anhydrous silicates, an expansion controller and a heat triggered neutralizer. The ingredients are blended and subsequently passed into an oven to dissolve the anhydrous silicate and to cause drying of the mixture. The mixture is then cooled and crushed into suitable size particles. The crushing operation produces undesirable dust, and the retention time required in the oven is between one and four hours. Long retention times along these lines require massive increases in the size or length of plant equipment and tend to severely limit production capacity.

U.S. Pat. No. 2,039,008 relates to the use of liquid silicates along with clays. The initial mixture is extruded into short cylinders and the cylinders are covered with talc to prevent them from sticking to each other. The coated cylinders are then heated to cause the silicate to puff. The addition of another compound (talc) added in a non-homogeneous fashion (as an outside coating) is undesirable, and no attempt is made to produce dense, easily handled, non-caking intermediate particles for expansion at a later time.

U.S. Pat. No. 2,117,605 relates to liquid silicates used along with other compounds to produce materials with a spumiform structure. After mixing and heating the ingredients, the resultant liquid is poured into shallow pans or onto a moving belt in an oven and dried until a hydrous crushable solid is obtained upon cooling. The material is then crushed to the desired size and this requires a grinding and sizing operation, with the undesirable production of dust.

It is accordingly one object of the present invention to produce dense, free-flowing, non-caking, non-dusting, easily handled particles which can be transported in their intermediate state to a remote location and, at the job site, treated to form the desired end product.

It is a further object of the present invention to produce relatively dense intermediate particles having a smooth outer surface, and which expand or intumesce when rapidly heated at about 400°-1600° F. into rigid particles of a spumiform nature, with particle volumes which are at least about five times the volume of the original particles.

It is another object of the present invention to produce dense intermediate particles without the need for long drying times, grinding, and/or the use of pressures greater than about atmospheric pressure. These and other objects will be apparent to those of skill in the art from the teachings herein.

SUMMARY OF THE INVENTION

A method is disclosed for producing dense, free-flowing, smooth surfaced, shippable alkali metal silicate-based intermediate particles which are heat expandable into lightweight particles of a spumiform character. A dilatant aqueous gel having a solids content in the range of about 38 to 65% and containing a liquid alkali metal silicate as the major component and optionally minor effective amounts of fillers and/or insolubilizers is pelletized at a pre-selected temperature. The gel is mechanically disruptible into smooth surfaced discrete pellets which are thereafter conditioned, and then dried to a moisture level of about 5 to about 30%, such as via a heated airstream. In a preferred method of carrying out the invention, the dilatant gel is formed into said pellets by extruding the gel at the pre-selected temperature and disrupting the extrusion by cutting or other means to form the pellets, which are then conditioned and dried.

BRIEF DESCRIPTION OF THE DRAWINGS

The invention is described in detail in connection with the drawings appended hereto, in which.

DETAILED DESCRIPTION

Figure 1:
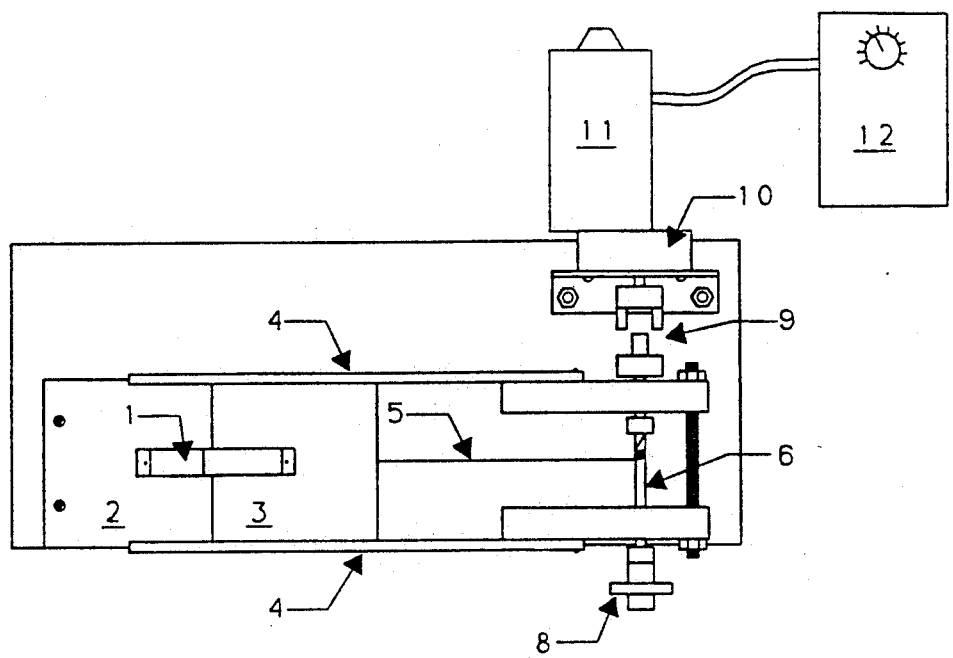
FIG. 1 is a plan view of a gel testing apparatus.

The term "spumiform" refers to the frothy or foamy nature of the resulting end product after the intermediate described herein is heated in accordance with the present invention. U.S. Pat. No. 2,117,605 correctly describes a spumiform structure as "a bubbled or intumescent solidified material having a structure similar to that of foam".

The term "dilatant" as used herein to describe the gel which is used to form the intermediate, means that the gel possesses the property of dilatancy. This is the inverse of thixotropy. The compositions containing sodium silicate which are contemplated herein in connection with the process of the present invention are those which, when intumesced into spumiform materials, have a relatively high volume expansion ratio of at least about five times. These compositions are comprised of sodium silicate and exhibit some moderate degree of alkalinity, e.g. pH greater than about eight. Completely or almost completely neutralized sodium silicates, such as commercially available silica gels or silica hydrogels, are generally incapable of the expansion ratios which are preferred when the present intermediate compositions are intumesced for end uses.

Compositions employing sodium silicate as a binder which contain less than about 50% sodium silicate on a weight/weight basis are less desirable than those compositions which contain higher levels of sodium silicate.

The final spumiform materials which are produced from the intermediate described herein can be employed as thermal or acoustical insulators, as well as bulking agents which are employed to lower the density of other materials in which they are included, such as concrete or gypsum. The ability to produce a dense material at a central location, with later on-site expansion to a lightweight end product, is very desirable and cost efficient from a shipping and handling standpoint.

Particles of a spumiform nature have been made employing soluble sodium silicates of the general formula $Na_2O:xSiO_2$ (weight ratio), where x equals a number between 1 and 7, usually between 2.0 and 3.3. These silicates are normally available in the form of solutions or solids. Normally, the more alkaline silicates are supplied in solutions having a solids content of 44 to 47%. The less alkaline silicates are available with solids contents of approximately 38%, lower solids being useful to increase the stability of the solution. Although potassium silicate rather than sodium silicate may be employed, the sodium silicate is usually cheaper and more readily available and is therefore usually the preferred starting material.

It is also useful to include various compounds along with these silicates to impart various properties to the resultant final spumiform particles. Thus, by adding immediately acting or heat activated insolubilizers in the form of acids or salts, finished particles with greater degrees of insolubility result. More alkaline silicates produce more soluble foams; less alkaline silicates tend to produce less soluble foams. Thus, acidic compounds added to any silicate solution will tend to lower the alkalinity, and thus produce less soluble foams. An example of a preferred insolubilizer for use herein is boric acid.

In addition, inert compounds added to the initial mixture tend to decrease the expansion of the materials, resulting in final spumiform particles of heavier densities. An example of a suitable preferred inert ingredient for use herein is hydrous magnesium silicate.

A method of manufacturing silicate-based compounds is described herein whereby non-caking, easily handled, expandable particles with a silicate content greater than 50% on a weight/weight (w/w) basis can be produced by adjusting the moisture content of the initial mix by diluting or drying to the point where a dilatant gel with very specific properties is formed. When prepared as described herein, the gel fractures when extended at a rate of between about 3 and 95 cm per minute at the particular temperature selected for subsequent processing. This gel, usually having a solids content of about 38% to 65%, depending upon the formulation, temperature, order of addition, etc., can then be easily pelletized or extruded into suitable shapes which, after a brief conditioning treatment or exposure to heated air for about one to about five seconds, while maintaining the pellets in a discrete form, can thereafter be easily dried into hard particles of the required size without the need for further grinding and sizing.

The extrusions or pellets can be allowed, for instance, to fall directly onto a dryer consisting of a rotating or shaking fine mesh screen through which air of a temperature of 100°–210° F. is passed from the bottom to the top of the screen. The screen surface is kept in motion to insure that the newly formed extrusions are separated from each other for a period of about one to five seconds. During this brief period, sufficient conditioning occurs to prevent the extruded particles from reagglomerating into undesirable larger masses. It appears that during the conditioning step, a non-tacky skin forms from the material at the surface of the pellets or particles, which skin then prevents reagglomeration or coalescence of pellets with one another.

The conditioned extrusions are then dried at about 100°–210° F. in any suitable dryer, such as a fluid bed dryer, to about a 5 to 30% moisture level, preferably about 20 to about 30% moisture level. The high surface area of the extrusion particles (as compared to a sheet or large chunk of material) allows the necessary drying to occur within a time period as low as about 10 minutes.

The resultant particles can thus be produced to the necessary size, for instance, by including and utilizing the proper extrusion orifice size, extrusion rate and the proper speed of the cutter which determines the size of the individual extrusion particles. The grinding of variously sized irregular chunks of material with the subsequent oversize fines and dust usually encountered, can thereby be essentially eliminated. If further desizing of the dried intermediate of the present invention is desired, it may be accomplished through the use of simple, energy-efficient sizing rollers, for instance, since the intermediates are relatively uniform and have a relatively narrow particle size distribution.

The herein described method also produces smooth surfaced, generally rounded particles or pellets as opposed to jagged particles produced through grinding. During subsequent expansion or intumescing, these smooth surfaced particles tend to expand more uniformly than jagged particles and, as a result, intumesced particles of a more spherical nature can be produced. Particles of a more spherical nature tend to flow more readily from a hopper, for instance, since they are less prone to bridging than particles having more angular surfaces. For any given material strength, spherical particles without angular surfaces are also less prone to breakdown and dusting during severe handling.

Figure 2:
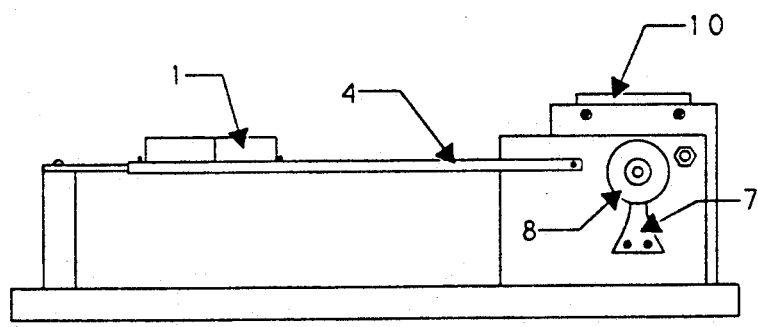
FIG. 2 is an elevational view of the gel testing apparatus utilized to test the properties of the intermediate-forming gel.

By extruding the gel in the proper fracturable stage and applying the proper initial conditioning and final drying techniques, particles are formed which will not cake or coalesce upon standing for long periods of time. This is most preferably accomplished without having to coat the extrusion particles with powdered insoluble materials to prevent caking or coalescing, thus eliminating the possibility of adversely affecting the finished product through the introduction of an additional material. Additionally, secondary processing steps can be avoided, as well as the problems associated therewith, such as a dusting problem, or making the particles unsuitable for expansion into a molded body by preventing their adherence to one another during expansion, or otherwise changing the chemical composition of the finished material. Assessment of the gel state, in particular, the fracture extension rate (FER), is useful in the practice of the present invention. The FER is easily calculated by means of the gel tester shown in FIGS. 1 and 2. To test the gel, a sample of the gel is placed in a two-piece sample boat 1 in such a manner as to completely fill the boat. The construction of the boat is such that one half of the boat telescopes into the other half by a distance of about 2 cm. In its test position, the preferred container has inside dimensions of about 80 mm (length) by about 20 mm (width) by about 15 mm (height). The filled boat is then placed in a suitable airtight container and allowed to age for a minimum of 30 minutes at the temperature selected for the test.

After aging, the sample boat is placed in the tester such that the descending pins of the boat fit into the holes in plates 2 and 3. In the preferred apparatus, plate 2 is fixed and plate 3 is movable along rails 4.

A thin cable 5 connects the movable plate 3 to shaft 6 which is normally held in a free-wheeling position by leaf spring 7. To one end of shaft 6 is attached actuator knob 8 which is mounted via a bearing to shaft 6 such that knob 8 is free-wheeling with respect to shaft 6. To the other end of shaft 6 is mounted one half of a positive clutch 9. The other half of the clutch is mounted to the output shaft of gearbox 10 which is driven by a variable speed DC motor 11, the speed of which is determined by the setting of motor speed controller 12.

In performing the test, the motor speed is adjusted to a minimum rate and allowed to stabilize for several seconds. The actuating knob 8 is then depressed, causing clutch 9 to engage, driving shaft 6, which winds cable 5, thus pulling apart plates 2 and 3 at a specific rate. As plate 3 moves away from plate 2, the two piece sample boat extends along its length, subjecting the sample contained therein to the designated extension force. As soon as plate 3 has moved a distance of 1.5 cm, the actuating knob is released and the motion of plate 3 ceases. The condition of the sample is noted, i.e. whether it stretched, or whether it fractured into two distinct bodies. If the sample did not fracture, plate 3 is slowly pushed back to its original position, the speed of the motor is increased, and the test is repeated. This procedure is followed until the sample is found to fracture cleanly in a direction generally transverse to the axis of extension into two distinct bodies and the extension speed is noted. This endpoint is quite distinct and surprisingly reproducible. The extension rate of the movable plate may be correlated to the setting of motor controller 12 empirically, or may be calculated by taking into consideration the RPM of the gearbox output shaft at any particular controller setting in conjunction with the circumference of shaft 6.

Samples found to fall outside the preferred FER range, i.e. those which fracture at rates lower than about 3.0 cm/minute, or greater than about 95 cm/minute, are not preferred for further processing, and the gel is modified according to the invention until it exhibits a fracture extension rate in the range of about 3 to 95 cm/minute. When extruding or pelletizing samples exhibiting fracture rates lower than about 3.0 cm/minute, extrudate or pellets are found to be extremely friable and crumble easily with subsequent handling into smaller particles which ultimately generates large amounts of dust upon drying. On the other hand, samples exhibiting fracture rates greater than about 95 cm/minute are found to readily coalesce after extruding or pelletizing, and the discrete quantities mass together. At excessively high FER levels, these pellets of gel tend to re-form a mass at the discharge end of the extruding or pelletizing apparatus.

Gel samples falling within the preferred FER range, however, are found to produce satisfactory particles or pellets. Hence, for blends with FER values of less than about 3.0 cm/minute, the solids content of the gel can be decreased, and the FER thereby adjusted to fall within the acceptable range. Similarly, if the FER is greater than about 95 cm/minute, the solids content can be increased by further heating the gel to remove additional water.

After subjecting the discrete gel-derived pellets to heated air at about 100° to 210° F. for about one to five seconds, the extruded pellets can be allowed to come into intimate contact with each other, such as when being collected for further drying, without coalescence or crumbling.

The gel fracturing test should be conducted at the temperature contemplated for subsequent extrusion or pelletization, since the FER will shift with temperature. Samples exhibiting fracture extension rates in the middle of the range can be processed at slightly different temperatures, however, since it will be found that the shifted fracture point will, in all likelihood, still remain within the preferred range.

Thus, dense, free-flowing, non-dusting, non-caking, smooth-surfaced easily handled particles of numerous formulations can be prepared which can be further treated by heat to form expanded or intumesced particles of a spumiform nature.

To demonstrate the applicability and flexibility of the process described herein to numerous formulations previously produced by more cumbersome methods, particle intermediates were produced employing commercially available liquid sodium silicate solutions. Various ancillary compounds, in liquid or solid form, were added to these silicate solutions as described in the examples below, and the mixtures were stirred to effect homogeneous dispersions or solutions of the ancillary compounds. The mixtures were then heated to between about 180° F. to about 205° F. with constant agitation, until some amount of water was removed. The mixtures were then cooled to the selected test temperature and the fracture extension rate was determined for each formulation at different solids contents by means of the gel fracture tester.

An attempt was then made to pelletize each sample for which a fracture extension rate was determined at the particular test temperature selected. Pelletization was attempted by means of a powered screw fed extruder. The discharge end of the extruder tube was fitted with an extrusion die having multiple 0.0670 (inch) diameter orifices. The rotary cutter blade at the face of the die was independently driven by means of an external variable speed motor and the speed of the blade was adjusted to yield pellets having a length approximately equal to the diameter of the individual extrusions. The pellets were allowed to free-fall from, the face of the die onto a vibrating screen assembly.

The screen assembly is constructed such that hot air injected at a temperature of 130°-140° F. into a compartment below a 50 mesh screen is directed up through the screen. This warm air contacts the extruded pellets as they land on the top surface of the screen. The vibration of the screen is adjusted to yield an average retention time of the particles on the screen of from about 1 to 5 seconds.

EVALUATION

Particles coming off the screen were evaluated for their tendency to coalesce or bind to each other when left in intimate contact with each other for 10 seconds.

Particles which readily separated after 10 seconds of contact and remained in their original form, and also did not tend to crumble into fine particles when rolled between the fingers, were deemed to be acceptable for further drying in a dryer such as a fluid bed dryer or a rotary kiln to a moisture content of 5 to 30%, during which drying step particles would retain their basic shape without binding or sticking together or without fracturing into smaller particles, thus generating significant amounts of dust.

The composition used to produce the intermediate particles was varied in accordance with the following non-limiting examples.

EXAMPLE 1

To 100 parts of sodium silicate liquid having an $Na_2O:SiO_2$ Weight ratio of 1:3.2 and a solids content of 38% (available as N Grade from PQ Corporation, Valley Forge, Pa.) was added 4 parts of finely divided hydrous magnesium silicate. The components were mixed until the hydrous magnesium silicate was completely dispersed in the liquid silicate. The mixture was heated with stirring at a temperature of 200° F. for 10 minutes. At this point the mixture was found to have a solids content of 46.0%. The mixture was cooled to 95° F. and a sample of the mix was subjected to the gel fracture test. The sample was found to fracture at an extension rate of 108 cm/minute at a temperature of 95° F. An attempt was made to extrude the sample at the test temperature. The material was found to be unsuitable for extrusion in that pellets produced at the die face agglomerated on the cutting blades.

EXAMPLE 2

The process described in Example 1 was repeated, except that the sample was further cooled to 77° F. at which temperature the material fractured at 92 cm/minute. Pellets extruded at this temperature remained as discrete particles coming off the vibrating screen, and although soft and pliable, were found to remain as discrete particles after 10 seconds of intimate contact, and were easily dried in a fluid bed drier.

EXAMPLE 3

A second composition containing the same formulation was produced according to the procedure described in Example 1, but the heating/mixing time was extended to allow for additional water evaporation. The mixture was determined to have a solids content of 50.0% and a fracture extension rate (FER) of 14 cm/minute at 77° F. When subjected to extrusion, pellets suitable for additional drying were formed. These pellets were subsequently dried to a solids content of 76.5% in a fluid bed dryer at a temperature of 135° F. for 45 minutes, and were subsequently found to be hard, free-flowing, non-caking and non-dusting, and had a density of 52.5 lbs./cu.ft. These intermediate particles, when subjected to a temperature of 800° F. in an oven were found to intumesce into relatively hard, light (5.8 lbs/cu.ft.) particles with smooth surfaces.

EXAMPLE 4

A third composition containing the same formulation was produced according to the procedure of Example 1, but in this instance the solids content of the mix was brought to 54.0%. This mixture had an FER of 2.2 cm/minute at 77° F., and upon attempting to extrude this mixture, it was found that the particles exiting the die were not smooth surfaced, but contained numerous fractures. Compressing these extrusions to approximately half their original height resulted in the disintegration of the particles into a fine powdery mass. This was surprising in that the gel at this point still contained 46% water. Additional drying of these particles resulted in pellets of various shapes and sizes with a large amount of dust present, and were not suitable for the uses contemplated herein.

EXAMPLE 5

Using the procedures outlined in Example 1, 100 parts of N Grade silicate and 8 parts of precipitated calcium carbonate were combined and tested at various water levels as described in Examples 1 to 4. Tests were run at 77° F. and the results are shown below in Table 1.

TABLE 1

| % Solids | Fracture Extension Rate (cm/min.) | Particles Coalesce | Particles Fracture | Particles Extrude |
| --- | --- | --- | --- | --- |
| 50.1 | 121 | Yes | No | No |
| 53.1 | 34 | No | No | Yes |
| 56.3 | 15 | No | No | Yes |
| 57.5 | 1.5 | No | Yes | No |

EXAMPLE 6

Using the procedure described in Example 1, 100 parts of N Grade silicate and 4.5 parts of boric acid dissolved in 20 parts water were combined. When brought to a solids content of 42.3% and a temperature of 77° F., the mixture had an FER of 62 cm/minute and produced satisfactory particles by the above extrusion process.

The mixture, lowered to a temperature of 50° F. was found to have an FER of 2.0 cm/minute and produced particles at this temperature that fractured upon exiting from the extruder die.

At 60° F., however, the mixture had a fracture extension rate of 3.2 cm/minute and was found to produce satisfactory particles.

EXAMPLE 7

The procedure described above in Example 1 was repeated using 100 parts of N Grade silicate, 1.2 parts of boric acid, and 21.3 parts of precipitated calcium carbonate which were combined. At a solids content of 53.5% and a temperature of 77° F. the material exhibited an FER of 110 cm/minute and produced extruded particles which coalesced.

An identical mixture brought to 56.8% solids exhibited an FER of 78 cm/minute and produced satisfactory particles at the same temperature of 77° F.

EXAMPLE 8

The procedure described above in Example 1 was repeated, using a modified formulation. Mixtures of 100 parts N Grade silicate and 13.5 parts sodium borate pentahydrate were prepared and evaporated to various solids contents and maintained at 77° F. At 42.0% solids, the composition exhibited an FER in excess of 120 cm/minute and produced coalescing particles.

At 45.8% solids and an FER of 95 cm/minute, the compound extruded and resisted coalescence for several seconds, but eventually did coalesce within 10 seconds.

At 46.3% solids and an FER of 79 cm/minute, however, the composition produced satisfactory particles.

Particles produced from a gel having a 47.2% solids and an FER value of 62 cm/minute were also satisfactory.

EXAMPLE 9

A mixture of 100 parts N Grade silicate, 3.8 parts boric acid and 5.9 parts Portland cement was combined in accordance with the process described in Example 1. When FERs within the range of 3 to 95 cm/minute were attained, satisfactory particles were produced.

EXAMPLE 10

A mixture of 100 parts of a sodium silicate solution having a solids content of 47% and an $Na_2O:SiO_2$ ratio of 1:2.4 (Grade RU, PQ Corp.) and 9.9 parts of precipitated calcium carbonate was combined according to the procedure of Example 1. This mixture also produced satisfactory particles when the FERs were within the range of 3 to 95.

While certain preferred embodiments of the invention have been described herein in detail, numerous alternative embodiments are contemplated as falling within the scope of the invention. Consequently the scope of the appended claims is not to be limited to the specific examples recited herein.

I claim:

1. A method for producing dense, freeflowing, non-caking and non-dusting alkali metal silicatebased particles which are heat expandable into lightweight particles of a spumiform character, comprising the steps of:

extruding at a selected temperature a dilatant aqueous gel comprising a liquid alkali metal silicate as the majority component, the solids content of said gel being in the range of about 38 to 65% (w/w), said gel being mechanically disruptible into smooth-surfaced discrete pellets at the selected temperature;

mechanically disrupting the extrusion to form said discrete pellets therefrom;

conditioning the extruded discrete pellets by heating in an airstream while maintaining said pellets as separate entities, to thereby form a skin on the particles so that they will not agglomerate or coalesce with one another; and drying the conditioned pellets to form particles having about a 5 to 30% (w/w) moisture level.

2. A method in accordance with claim 1, wherein said conditioning is carried out at an airstream temperature of from about 100° to 210° F. for at least one second.

3. A method in accordance with claim 2, wherein said dilatant gel has a Fracture Extension Rate in the range of about 3 to about 95 cm/minute.

4. A method in accordance with claim 1, wherein said dilatant aqueous gel is characterized in that when extended at said selected temperature at a rate of about 3-95 cm/minute, said gel fractures cleanly across the axis of extension, and when extruded at said selected temperature and mechanically disrupted into said discrete pellets and subjected to said conditioning in a heated airstream for about 1 to 5 seconds, said pellets remain in discrete form for at least about 10 seconds without coalescing on intimate contact with other of said pellets.

5. A method in accordance with claim 1, wherein said dilatant aqueous gel further includes an effective amount of one or more members selected from the group consisting of fillers and insolubilizers.

6. A method for producing dense, freeflowing, non-caking and non-dusting alkali metal silicate-based particles which are heat expandable into lightweight particles of a spumiform character, comprising the steps of:

pelletizing at a selected temperature a dilatant aqueous gel comprising a liquid alkali metal silicate as the majority component, the solids content of said gel being in the range of about 38 to 65% (W/W), said gel being in the disruptible into smooth-surfaced discrete pellets at the selected temperature;

conditioning the discrete pellets in an airstream while maintaining said pellets as separate entities, to thereby form a skin on the particles so that they will not agglomerate or coalesce with one another; and drying the conditioned pellets to form particles having about a 5 to 30% (W/W) moisture level.

7. A method in accordance with claim 6, wherein said conditioning is carried out at an airstream temperature of from about 100° to 210° F. for at least one second.

8. A method in accordance with claim 7, wherein said dilatant gel has a Fracture Extension Rate in the range of about 3 to 95 cm/minute.

9. A method in accordance with claim 8, wherein said dilatant aqueous gel is characterized in that when extended at said selected temperature at a rate of about 3-95 cm/minute, said gel fractures cleanly across the axis of extension; and when extruded at said selected temperature, mechanically disrupted into said discrete pellets and subjected to said conditioning in a heated airstream for about 1 to 5 seconds, said pellets remain in discrete form for at least about 10 seconds without coalescing on intimate contact with other of said pellets.

10. A method in accordance with claim 6, wherein said dilatant aqueous gel further includes an effective amount of one or more members selected from the group consisting of fillers and insolubilizers.

* * * * *